Patented Dec. 17, 1935

2,024,791

UNITED STATES PATENT OFFICE 2,024,791

PROCESS FOR THE MANUFACTURE OF MASSES AND ARTICLES HAVING A POROUS CELLULAR STRUCTURE

Gustav Adolph, Munich, and Theodor Pohl, Frankfort-on-the-Main, Germany, assignors to Leichtbaustoff - Gesellschaft m. b. H., Frankfort-on-the-Main, Germany, a corporation No Drawing. Application January 20, 1933, Serial No. 652,774. In Germany January 27, 1932

10 Claims. (Cl. 106—24)

Our invention relates to the production of materials having a vesicular structure, and more particularly it relates to the production of building materials having such structure.

Products constructed from materials of this general nature have been known for some time. They possess the advantage of being relatively very light in weight, while at the same time they possess substantially the same strength of solid objects of similar size and shape. Moreover, such products have increased insulating properties both with respect to heat and sound.

The method generally employed for producing the cellular structure of such materials is characterized by the liberation of gas within a moistened mass of hydraulic binding and other materials. This gas liberation is usually accomplished before the mass is placed in molds and before it has had time to set and harden. Such masses may be employed to form artificial building stones or slabs, or may be applied while still plastic as an insulation filler or on a wall surface. In fact the material may be used in many other ways commensurate with its nature and properties.

Heretofore, the generation of gas within the mass has been accomplished in various ways. For example, carbon dioxide ($CO_2$) has been generated by using an acid salt, such as aluminum sulphate, and a carbonate of the alkali group, e. g., sodium, magnesium or the like. Moreover, metals such as magnesium, zinc, aluminum, or metal alloys such as those of sodium, calcium, magnesium, silicon, or the like have been incorporated with hydraulic binding and other materials together with the liquids, such as water, to develop hydrogen.

In the recent past the use of hydrogen peroxide as an active oxygen containing combination has enjoyed considerable popularity. When this is used the gas liberation has been effected by the use of catalysts, such as blood flour. Sometimes so-called accelerators have also been added.

In some of the prior art processes, it has been found that the material used to effect the gas liberation reacts very sluggishly, if at all. This is particularly so in the case of aluminum powder, and also when lime is present in combination with hydrogen peroxide in the binding material since lime has a tendency to "bind" the hydrogen peroxide, that is, to prevent or restrain the normal gas liberation. When this is the case, the generation of hydrogen, oxygen or other gases has not been completed before the cement has started to set. The hydrogen generation will often continue while the cement, gypsum or other binding material is still in the process of setting, and the bulk of the material will increase for a time after it has been poured and commenced to set. With such a condition present it is impossible to calculate accurately the volume of a plastic mass which will fill a given area. Moreover, eventually this continued generation of the gas leads to the complete destruction of the mass since it naturally counteracts the coherence within the mass.

Such a condition prevents the final product from having a cell structure which is uniform throughout both as to texture and to the size of the cells. The present invention obviates the disadvantages mentioned.

One object of the invention is the provision of a method of making a cellular plastic product which has a homogeneous cellular structure throughout.

Another object of the invention is to effect the gas liberation within the plastic mass by means of a chemical transformation or conversion.

The invention has for a further object the provision of a method for accelerating and controlling the gas liberation so as to assure a finished product of uniform texture and size.

These and other features of the invention will become more apparent from the following description and will be pointed out in the appended claims.

We have found that excellent results are obtained when substances are used which are capable of producing or liberating the oxygen or other gas in the mass by chemical reaction or transformation. Comparative experiments have shown that by using such substances, it is possible to obtain a much greater yield of efficacious gas from the gas-containing compounds than when catalysts and accelerators alone are used. The vesicular structure and porosity of the mass produced is thereby increased, and, this, of course, means that the finished product will have a greater volume. Moreover, it is possible by using such substances to regulate more accurately and effectively the development of the gas within the mass and to effect a more even distribution of the cells.

Thus, for instance, an experiment carried out with 2400 grams Portland cement to which 40 cc. of hydrogen peroxide containing 30 grams $H_2O_2$ in 100 cc., 20 cc. concentrated ammonia, and 10 grams manganese sulphate (the latter as a catalyst), were incorporated, produced in the finished product a volume of 3½ liters. A parallel experiment carried out with the same amount of Portland cement and with only 20 cc. of hydrogen peroxide (30% by volume) to which were added 20 grams of potassium permanganate in aqueous solution or 75 grams bleaching powder which was previously suspended in water, (or 150 cc. of a sodium hypochlorite solution containing 9% of active chlorine) yielded a product having a volume of about 4½ liters. Moreover, a particularly uniform liberation and an even distribution of the gas was noted.

When employing this chemical reaction method, all materials which liberate oxygen in combination with hydrogen peroxide or peroxides in the presence of water are suitable. Especially suitable for this purpose are the salts of the hypochlorous acid which liberate according to the reaction

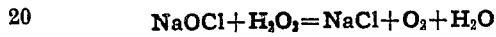
$$NaOCl + H_2O_2 = NaCl + O_2 + H_2O$$

aside from a part of oxygen from the peroxide, also a part of oxygen from the hypochlorite. The efficiency of the process is thus considerably increased. The process has the further advantage that the peroxides of the alkalis and alkaline earths can be utilized.

*Examples*

(1) 2400 g. of cement are added to a solution made up by mixing 830 cc. of water, 100 cc. soap solution containing 0.5 g. soap and 15 cc. of hydrogen peroxide (30%). To the intimate mixture 150 cc. of sodium hypochlorite lye containing 9% of active chlorine are added. The stone obtained possesses after solidification and drying a specific gravity of about 0.74.

(2) A mixture of 6200 g. of cement and 1000 g. of sand is stirred into a solution which is made up by mixing 3000 cc. of water 90 cc. soap solution containing 0.5% soap and 150 cc. hydrogen peroxide (30%). After thorough mixing a suspension of 340 g. bleaching powder containing 30% of active chlorine in 425 cc. water is added to the cement mixture. The resulting stone has after solidification and drying a specific gravity of approximately 0.3.

Materials which may be used to effect the chemical reaction for the gas liberation are, for example, potassium permanganate, calcium hypochlorite, sodium hypochlorite, and the like.

In certain cases, the catalyst method and the chemical reaction method may be combined. Using the materials noted and the same quantity of the active oxygen containing combinations (calculated to $O_2$) to obtain still better gas yields and thereby a greater swelling effect and a larger volume in the final products, or to subsist with smaller quantities of active oxygen containing combinations for obtaining the same swelling effect or volume. It is further possible in this way to effect a still better adjustment and a more uniform gas liberation within the masses.

It is clear that in practicing the described invention, the quantity of the oxygen containing substances on the one hand, and of those substances which may be added to the binding material to effect further or regulate the generation of the gas, may vary. The quantity of these substances depends upon the effect desired as far as the size and numbers of the cellules are concerned, and, furthermore, on the length of time required for the setting of the binding material, as well as on the kind of material itself. The quantities of substances to be used are preferably adapted and regulated in such a way that the development of the gas is substantially finished when the formed mass begins to set and solidify.

In some cases the presence of some quantities of alkaline substances or ammonia has been useful. The presence of these substances favors the decomposition of the active oxygen-containing materials with the consequent development of oxygen.

Moreover, we have found that the size and the number of cellules in the mass and thereby the volume of the products may be influenced to a large degree by the addition of suitable means which are capable of modifying the surface tension in the water or liquid which is used in preparing the mass. We have found that soapy water is particularly suitable for this purpose. Other substances which may be used in this connection are, for example, saponine, albuminoids, gum Arabic, colloidal earths, such as bentonite and the like.

Moreover, our invention also permits the manufacture of products which only partially consist of binding or setting substances, and which in addition contain other materials which are not capable of binding or setting but are able to impart other desirable properties to the finished product. For instance, materials may be added which render the final products more fireproof, or decrease the conductivity of sound therein, or improve the mechanical strength. Thus, for instance, mixtures of cement and gravel, sand, or the like, as are used for producing concrete, may be worked according to our invention. In this connection, we might mention that finely milled cork or the like may also be placed in the mix. By such additions, we obtain masses, building stones, or slabs which excel by reason of some desirable quality, as for example, the small degree of conductivity of sound in the walls produced by them. An addition of fibrous materials such as hair, straw and the like has proved useful for improving the separation of the mixture of the component parts.

Our products may also be improved by the addition of substances such as alkali metal silicates, silica fluorides, hydrated lime and the like to the binding substances or the mixtures of binding and non-binding substances. These substances possess the property of hardening when exposed to the air and will thus increase the mechanical strength of the products resulting. Similar effects may also be obtained by the addition of solidifying means of an organic nature. It is also feasible to stabilize the finished masses or articles produced according to our invention by treating them with hardening solutions, such as by immersing them in such solutions.

Having described our invention, what we claim as new and desire to secure by Letters Patent of the United States is:

1. Process for the production of masses and articles having a vesicular structure and in which binding materials are mixed with hydrogen peroxide, which consists in effecting the gas liberation by the addition of a material which reacts chemically with the hydrogen peroxide and undergoes chemical change, in substantially stoichiometrical proportions with the hydrogen peroxide.

2. Process for the production of masses and articles having a vesicular structure and in which binding materials are mixed with hydrogen peroxide, which consists in effecting the oxygen liberation by chemically effective alkali salts.

3. Process for the production of masses and articles having a vesicular structure and in which binding materials are mixed with hydrogen peroxide, which consists in effecting the oxygen liberation by a substance selected from the group consisting of alkali metal and alkali earth salts of hydrochlorous acid.

4. Process for the production of masses and articles having a vesicular structure which consists in mixing binding materials with peroxides of the group consisting of alkalis and alkaline earths, and effecting the oxygen liberation by adding chemically effective materials which react in substantially stoichiometrical proportions with the said peroxides.

5. Process for the production of masses and articles having a vesicular structure and in which materials capable of liberating oxygen are combined with binding materials, which consists in adding materials capable of effecting the liberation of oxygen by chemical conversion by which the added material undergoes chemical reaction in stoichiometrical proportions.

6. Process for the production of masses and articles having a vesicular structure and in which materials capable of liberating oxygen are combined with binding materials, which consists in adding materials capable of effecting the liberation of oxygen by chemical conversion by which the added material undergoes chemical reaction in stoichiometrical proportions, and in also adding catalysts to assist in effecting said oxygen liberation.

7. Process for the production of masses and articles having a vesicular structure and in which materials capable of liberating oxygen are combined with binding materials, which consists in adding potassium permanganate to effect the liberation of oxygen by chemical transformation.

8. Process for the production of masses and articles having a vesicular structure and in which materials capable of liberating oxygen are combined with binding materials, which consists in adding calcium hypochlorite to effect the liberation of oxygen by chemical transformation.

9. Process for the production of masses and articles having a vesicular structure and in which materials capable of liberating oxygen are combined with binding materials, which consists in adding an alkali hypochlorite to effect the liberation of oxygen by chemical transformation.

10. A process for the production of masses and articles possessing a vesicular structure, which comprises mixing with binding materials hydrogen peroxide and at least one compound capable of reacting chemically in stoichiometrical proportions with the hydrogen peroxide and of being converted by such reaction to a different compound, to release oxygen from the hydrogen peroxide.

GUSTAV ADOLPH.
THEODOR POHL.